US006293141B1

(12) United States Patent
Nance

(10) Patent No.: US 6,293,141 B1
(45) Date of Patent: Sep. 25, 2001

(54) METHOD OF DETERMINING STATUS OF AIRCRAFT LANDING GEAR

(75) Inventor: C. Kirk Nance, Keller, TX (US)

(73) Assignee: Trinity Airweighs LLC, Keller, TX (US)

( * ) Notice: Subject to any disclaimer, the term of this patent is extended or adjusted under 35 U.S.C. 154(b) by 0 days.

(21) Appl. No.: 09/577,067

(22) Filed: May 22, 2000

Related U.S. Application Data

(62) Division of application No. 08/838,199, filed on Apr. 15, 1997.

(51) Int. Cl.[7] .................................................. G01C 21/00
(52) U.S. Cl. ................................................................ 73/178
(58) Field of Search ................................ 73/178 T, 865; 701/124; 702/98, 173, 175

(56) References Cited

U.S. PATENT DOCUMENTS

| | | | |
|---|---|---|---|
| 2,255,814 | 9/1941 | Roche ..................................... 265/40 |
| 3,513,300 | 5/1970 | Elfenbein et al. ................. 235/150.2 |
| 3,581,836 | 6/1971 | Segerdahi et al. ........................ 177/1 |
| 3,584,503 | 6/1971 | Senour ..................................... 73/65 |
| 3,701,279 | 10/1972 | Harris et al. .............................. 73/65 |
| 3,800,893 | 4/1974 | Ramsay et al. . |
| 3,802,523 | 4/1974 | Clark . |
| 3,900,828 | 8/1975 | Lage et al. .......................... 340/27 R |
| 4,007,894 | 2/1977 | Hartel . |
| 4,034,334 | 7/1977 | Allyn . |
| 4,110,605 | 8/1978 | Miller ................................... 364/463 |
| 4,225,926 | 9/1980 | Wendt ................................... 364/463 |
| 4,371,182 | 2/1983 | Brown . |
| 4,446,524 | 5/1984 | Wendt ................................... 364/463 |
| 4,490,802 | 12/1984 | Miller ................................... 364/567 |
| 4,502,555 | 3/1985 | Gower ................................... 177/25 |
| 4,607,530 | 8/1986 | Chow ..................................... 73/708 |
| 4,651,292 | 3/1987 | Jeenicke et al. ..................... 364/571 |
| 4,715,003 | 12/1987 | Keller et al. ......................... 364/571 |
| 4,796,212 | 1/1989 | Kitagawa ............................. 364/571 |
| 4,866,640 | 9/1989 | Morrison, Jr. ....................... 364/558 |
| 4,935,885 | 6/1990 | McHale et al. ...................... 364/567 |
| 5,117,687 | 6/1992 | Geradi ................................. 73/170 R |
| 5,214,586 | 5/1993 | Nance . |
| 5,258,582 | 11/1993 | Junginger ............................. 177/141 |
| 5,521,827 | 5/1996 | Lindberg et al. .................... 364/463 |
| 5,548,517 | 8/1996 | Nance ................................... 364/463 |
| 5,610,372 | 3/1997 | Phillips et al. . |

OTHER PUBLICATIONS

B. J. Hawkins, "STAN–for Aircraft Take–Off Weight and Balance", Instruments and Control System, vol. 38, Feb. 1965, pp. 89–93.
B. J. Hawkins, The STAN (R) "S" Integral Weight and Balance System for the C–130 Aircraft, presented at the Society of Allied Weight Engineers, Inc. Jun. 25–27, 1973.
Brochure by Fairchild Controls, "Aircraft Pressure and Load Systems, " 1965 (No month).
Pressure and Strain Measurement Handbook and Encyclopedia, Omega Engineering, Inc. 1984, pp. A9–A16. (No month).
Patent Cooperation Treaty International Search Report on International Application No. PCT/US98/05007 entitled "Aircraft Weight and Center of Gravity Indiciator" (5 sheets), Applicant: Trinity Airweighs, LLC.

Primary Examiner—William Oen
(74) Attorney, Agent, or Firm—Geoffrey A. Mantooth

(57) ABSTRACT

An onboard system for use in measuring, computing and displaying the weight and center-of-gravity for aircraft, while keeping aircraft movement to a minimum. Pressure sensors are mounted in relation to each of the landing gear struts. An onboard pump and reservoirs are attached to each of the landing gear struts and are activated by a computer/controller, while landing gear strut pressures are monitored in the determination of strut stiction. The computer/controller calculates the stiction of each landing gear strut and compensates for the pressure distortions caused by landing gear strut stiction. Additional features include reducing strut stiction, measuring landing gear strut fluid levels, monitoring landing gear strut health, weight adjustments for external ice and de-icing fluids, weight adjustments for wind, monitoring aircraft landing gear strut movement.

2 Claims, 14 Drawing Sheets

Isolation Metering Cylinder (IMC)

METHOD OF DETERMINING STATUS OF AIRCRAFT LANDING GEAR

This application is a divisional application of pending U.S. application Ser. No. 0/838,199, filed Apr. 15, 1997.

BACKGROUND OF THE INVENTION

Two critical factors in the flight of any aircraft are the weight and balance of that aircraft. An airplane manufacturer must publish the maximum gross weight of that airplane. This is to insure that at take-off speed, the wings are generating sufficient lift to lift the weight of the airplane. An equally important factor to consider is whether the airplane is in proper balance (center of gravity) or within acceptable limits, as can be compensated for by trim adjustments.

The weight of an aircraft is supported on a plurality of collapsible landing gear struts. These landing gear struts contain pressurized hydraulic fluid and nitrogen gas. The pressure within each landing gear strut is related to the amount of weight that landing gear strut is supporting. Aircraft landing gear struts incorporate the shock absorbing technique of forcing hydraulic fluid through an orifice within the strut. The nitrogen gas is an additional cushioning agent. Multiple O-ring seals within the landing gear strut are used to retain the hydraulic fluid and compressed nitrogen gas contained within each landing gear strut. The retention of the compressed nitrogen gas and hydraulic fluid by the O-ring seals is due to the extreme amount of friction these seals maintain as they move up and down the cylinder walls of the landing gear strut. This friction (defined in the aircraft strut industry as "stiction"), while it may improve the shock absorbing quality of the landing gear strut, distorts internal landing gear strut pressures, as those pressures relate to the amount of weight the landing gear strut is supporting. Compensations are needed to correct for distorted pressure readings caused by the stiction within these landing gear struts in order to accurately determine the aircraft weight.

Previous systems to determine gross weight and center of gravity are well known and well documented. Reference may be made to U.S. Pat. No. 3,513,300 Elfenbein, U.S. Pat. No. 3,581,836 Segerdahl, U.S. Pat. No. 5,521,827 Lindberg et al, and this inventor, U.S. Pat. No. 5,214,586 and U.S. Pat. No. 5,548,517 Nance.

U.S. Pat. No. 3,513,300 Elfenbein, identified the relationship between aircraft weight and the pressure within the landing gear struts. Elfenbein pioneered the art of measuring landing gear strut pressure and relating it to the amount of weight supported. The Elfenbein prior art does not compensate for landing gear strut pressure distortions caused by strut stiction.

U.S. Pat. No. 3,581,836 Segerdahl, identified friction as a factor causing errors in the relationship between the pressure within the landing gear struts and the aircraft weight. The Segerdahl prior art incorporates the practice of injecting and withdrawing fluid from the landing gear struts. Segerdahl teaches the practice of measuring the pressure of hydraulic fluid within the hydraulic line that is used to inject and withdraw hydraulic fluid into and from the landing gear strut. This practice measures pressure which is not solely related to weight supported and landing gear strut friction, but also measures the higher pressure of the hydraulic fluid injection mechanism and the lower pressure of the hydraulic fluid withdrawal mechanism. This false higher or lower pressure, which is assumed to be landing gear strut pressure, and which is used in the weight calculations, is distorted by the pressure differential between the pressure within the body of the landing gear strut and that of the higher or lower pressure of the hydraulic fluid injection mechanism. Erroneously high pressures are measured as hydraulic fluid is injected into the strut, as well as erroneously low pressures are measured as hydraulic fluid is withdrawn from the strut. There must be a substantially higher pressure in the hydraulic fluid injection mechanism, or the landing gear strut would not extend and a substantially lower pressure in the hydraulic fluid withdrawal mechanism, or the landing gear strut would not collapse. Segerdahl's prior art also ignores pressure fluctuations in the landing gear's nitrogen gas caused by the compression of that nitrogen gas. As hydraulic fluid is injected into a landing gear strut the nitrogen gas is compressed. The compression of the nitrogen gas generates heat. As the temperature of the compressed nitrogen gas increases, the pressure of the nitrogen gas, as well as the hydraulic fluid it is in direct contact with, will increase to a pressure higher than that pressure directly related to the landing gear strut friction and weight the strut is supporting. These sources of error are not recognized by the Segerdahl prior art.

U.S. Pat. No. 5,521,827 Lindberg et al, continues the Segerdahl and Nance (to be described below) prior art on the identification of friction as a factor causing errors in the direct relationship between the pressure within the landing gear struts and the aircraft weight. Lindberg teaches the practice of multiple hydraulic fluid injections raising each landing gear strut to near fill extension and multiple hydraulic fluid withdrawals lowering each landing gear strut to near full collapse. While these extreme up and down movements, raising and lowering the aircraft as much as 2–3 feet, may offer some relief to the potential errors in the prior art taught by Segerdahl, such extreme aircraft movement is incompatible with today's aircraft loading procedures which utilizes a floating passenger "jet-bridge" adjacent to the aircraft door and baggage loading conveyor belts which extend directly into each of the aircraft's cargo compartments. Extreme aircraft movement could cause severe damage to the aircraft or injuries to passengers if the Lindberg practice were to be used during the aircraft loading process.

This invention relates to improvements to the above mentioned prior art as well as the prior art of this inventor (Nance) U.S. Pat. No. 5,214,586 and U.S. Pat. No. 5,548,517. The Nance technology, among other things, measures the pressure distortions caused by strut seal friction, then stores that information for future reference in the event the hydraulic fluid injection and withdrawal mechanism is not functioning. This technology incorporates the storage of defined pressure limits to be used in the determination of hard landings by the aircraft. This technology also measures strut fluid temperature and adjusts for pressure distortions caused by changes in temperature.

SUMMARY OF THE INVENTION

It is one object of the present invention to provide improvements to this inventor's previous onboard aircraft weight and center of gravity indicator, which utilizes pressurized landing gear struts.

It is another object of the present invention to provide an onboard aircraft weight and center of gravity indicator that minimizes vertical movement of the aircraft during weight measurements.

It is another object of the present invention to provide an onboard aircraft weight and center of gravity indicator that minimizes the change in strut fluid temperature, which in effect changes the pressure of strut fluids during weight measurements.

It is another object of the present invention to determine the relative amounts of hydraulic fluid and gas in a particular aircraft strut.

The present invention provides a method of obtaining information about an aircraft. The aircraft is supported by plural pressurized landing gear struts. The landing gear struts experience friction, which is often referred to as stiction. This stiction distorts internal strut pressures as they relate to weights supported by the landing gear struts. The landing gear struts comprise a fluid. The method changes the amount of fluid in each of the landing gear struts so as to move the respective landing gear strut in a first direction. The movement of each of the landing gear struts is detected. Upon the detection of the movement of a respective landing gear strut, the step of changing the amount of fluid in the respective landing gear strut is ceased so as to keep strut movement to a minimum, thereby minimizing aircraft movement, and also to minimize temperature changes and pressure distortions caused by the temperature changes of the respective landing gear strut fluid. The steps of changing the amount of fluid in each of the landing gear struts, detecting the movement of each of the landing gear struts, and ceasing to change the amount of fluid in each respective landing gear strut is repeated so as to move the landing strut in a second direction that is opposite to the first direction. During the above steps, the pressure within each of the landing gear struts is determined. These pressure determinations are used to compensate for distortions caused by strut stiction.

In accordance with one aspect of the present invention, the step of detecting the movement of each of the landing gear struts further includes the step of detecting changes in the respective strut pressures and detecting peaks in the strut pressure changes. The step of detecting the movement of each of the landing gear struts further includes the steps of detecting a peak pressure, and a pressure reversal, followed by a steady pressure.

In accordance with another aspect of the present invention, all of the struts in the aircraft are coordinated to move in the same direction. Before the struts move in the second direction, all strut must have ceased movement. These aspects further minimize aircraft movement.

In accordance with another aspect of the present invention, the stiction is reduced by moving the struts slightly to lubricate adjoining strut surfaces. This strut movement typically occurs before strut movement for weight measurements are made. Such pre-stroking lubricates the seals, thereby reducing stiction, thereby reducing pressure distortions caused by stiction. Reducing the amount of stiction experienced during the stiction measurement process will reduce the error in the final aircraft weight measurement.

In accordance with another aspect of the present invention, the steps of changing the amount of fluid in each strut occurs at a first access port of the respective landing gear strut, while the step of measuring the pressure within the strut occurs at a second access port of the respective strut. The first and second access ports are physically separated by a volume of fluid in the strut. Alternatively, the steps of changing the amount of fluid in each strut occurs at a first access port, which is the only access port, wherein a pressure-to-flow separation fitting is used to avoid distortions in the pressure determinations caused by fluid flow.

In accordance with another aspect of the present invention, the step of detecting the movement of the respective landing gear strut further includes the step of detecting the movement by a mechanical sensor attached to the respective landing gear strut.

In accordance with another aspect of the present invention, the steps of changing the amount of fluid in each landing gear strut is performed by a pump. A particular type of pump used is an Isolation Metering Cylinder.

In accordance with another aspect of the present invention, the steps of changing the amount of fluid so as to move the respective landing gear strut in the first direction and then in the second direction produce a net change in the fluid in the respective landing gear strut of zero. This net change of zero in the amount of fluid in the strut after measuring pressure is useful in insuring that the strut is properly maintained.

In accordance with another aspect of the present invention, the first direction is to extend the strut and the second direction is to collapse the strut. When the strut is extended, a slightly higher stiction is encountered than when the strut is collapsed and is referred to as "asymmetrical stiction."

In accordance with another aspect of the present invention, the weight supported by each of the landing gear struts is determined from the compensated pressure determinations and the unsprung weight. Unsprung weight is the weight of those aircraft landing gear components located below the fluid contained within the landing gear strut. The weight of the aircraft is determined from the respective compensated weight determinations. The center of gravity of the aircraft can be determined from the compensated weights. The step of compensating the pressure determinations of the landing gear struts for the distortions caused by strut stiction further includes the step of applying an offset to the weight determinations from each landing gear struts so as to compensate for any asymmetrical stiction of the landing gear struts.

In accordance with another aspect of the present invention, the step of determining the weight of an aircraft occurs while the aircraft is being loaded or unloaded.

In accordance with still another aspect of the present invention, the determined aircraft weight is compensated for errors caused by wind passing across the aircraft wings and generating weight distorting wing lift. Also, the determined aircraft weight is compensated for errors caused by external ice accumulations or external fluids on the aircraft.

The present invention also provides a method of determining a weight of an aircraft, which aircraft is supported by plural pressurized landing gear struts. The aircraft has a portal that is vertically aligned with a loading device, wherein objects can be loaded on and off the aircraft through the portal using the loading device. The method changes the amount of fluid in each of the landing gear struts so as to move the respective landing gear strut. The movement of each of the landing gear struts is detected. The vertical alignment of the portal with the loading device is maintained by discontinuing the changing of the amount of fluid in the respective landing gear strut upon the detection of the movement of the respective landing gear strut. During the steps of changing the amount of fluid in each of the landing gear struts, detecting the movement of each of the landing gear struts, and maintaining the vertical alignment of the portal with the loading device by discontinuing the changing the of amount of fluid in the respective landing gear strut, the pressure within each of the respective landing gear struts is determined. These pressure determinations are compensated for distortions caused by stiction. The weight supported by each of the landing gear struts is determined from the respective compensated pressure determinations and unsprung weight. The weight of the aircraft is determined from the respective compensated weight determinations.

In accordance with another aspect of the present invention, the loading device can be a passenger ramp or a cargo ramp.

The present invention also provides a method of determining the relative amounts of gas and liquid in an aircraft landing gear strut. The amount of fluid in the strut is changed. The pressure in the strut is measured while changing the amount of fluid. The rate of change of pressure during at least one of steps of changing the amount of fluid in each of the landing gear struts is determined. The fluid includes a liquid and a compressed gas. The amount of the compressed gas relative to the amount of the liquid is determined in each strut from the rate of change of pressure for that strut. In this manner, the relative health of the strut can be determined.

In accordance with another aspect of the present invention, the step of determining the relative amount of liquid to gas further includes the step of comparing the measured rate of change of pressure of the strut to a look up table of known rates of change in pressure.

The present invention also provides an apparatus for determining the weight of an aircraft. The aircraft is supported by plural pressurized landing gear struts. The landing gear struts experience stiction. The stiction distorts internal pressures as they relate to weights supported by the landing gear struts. The struts comprise fluid. The apparatus has a pump for injecting and/or withdrawing fluid from each of the landing gear struts. A pressure sensor is mounted on each of the landing gear struts so as to sense the pressure of fluid therein. A movement sensor is mounted on each of the landing gear struts so as to detect the movement of the landing gear struts. A controller has an input that is coupled to the movement sensor and an output that is coupled to the pump, wherein the controller causes the pump to cease injecting or withdrawing fluid from the strut when strut movement is detected by the movement sensor. An aircraft weight computer is coupled to the pressure sensors. The aircraft weight computer determines the weight of the aircraft from the sensed pressures.

BRIEF DESCRIPTION OF THE DRAWINGS

Although the features of this invention, which are considered to be novel, are expressed in the appended claims; further details as to preferred practices and as to the further objects and features thereof may be most readily comprehended through reference to the following description when taken in connection with the accompanying drawings, wherein:

FIG. 8 is an exploded pictorial diagram of the strut pressure sensor assembly.

DETAILED DESCRIPTION OF THE PREFERRED EMBODIMENT

Figure 1:
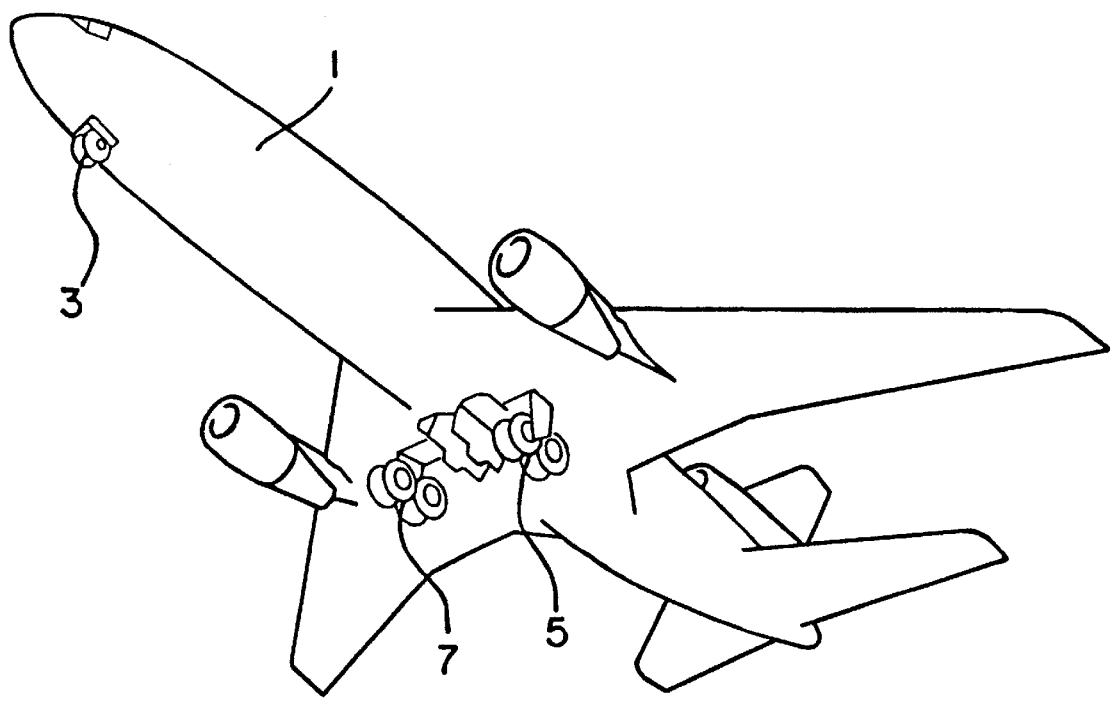
FIG. 1 is a view of the lower side of a typical commercial airliner with a tricycle type landing gear, in the extended position.

Referring now to the drawings, wherein like reference numerals designate corresponding parts throughout the several views and more particularly to FIG. 1 thereof, there is shown a typical commercial airliner 1 with tricycle landing gear configuration consisting of a nose landing gear 3, port main landing gear 5, and starboard main landing gear 7.

Figure 2:
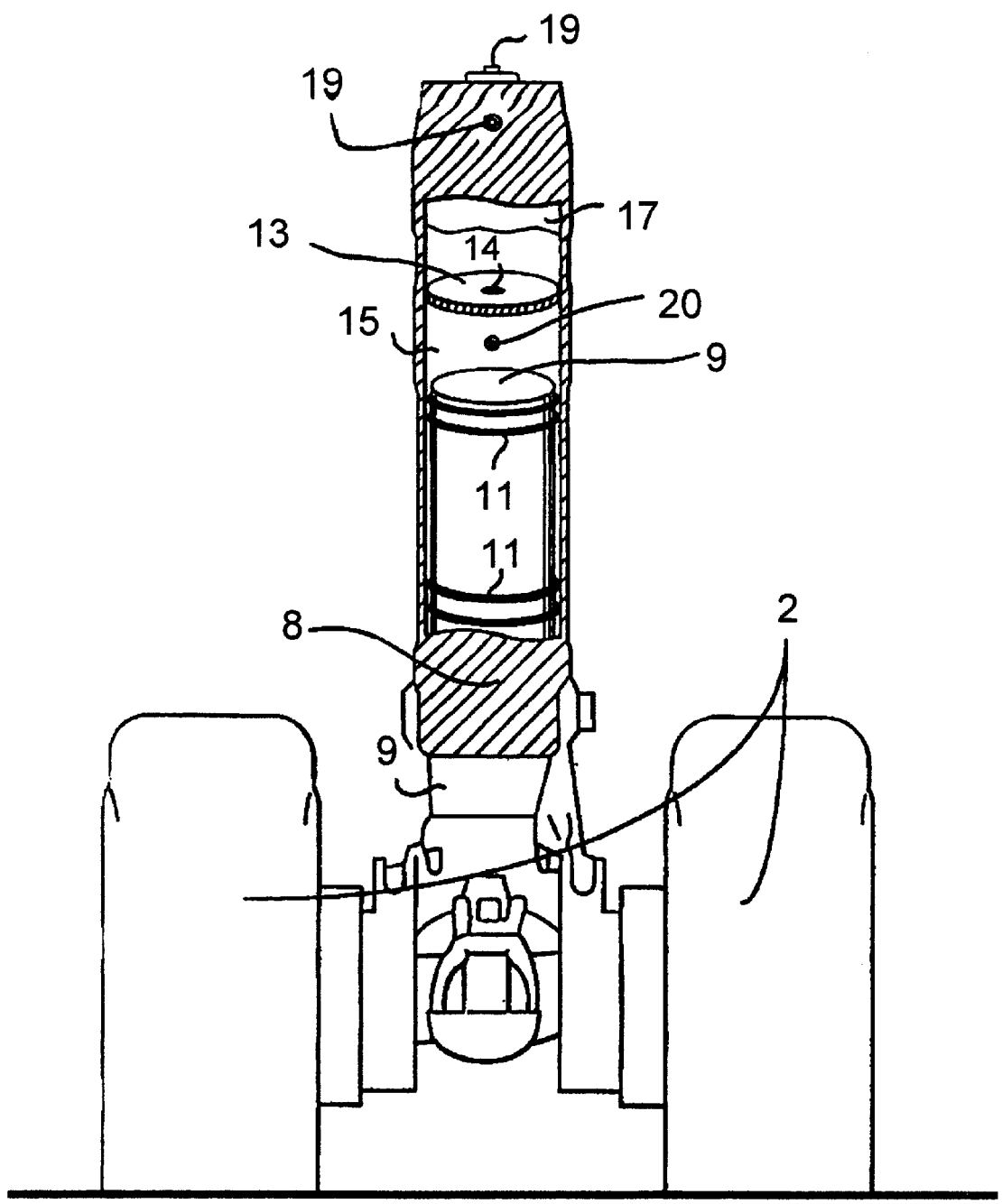
FIG. 2 is a partial cross-sectional front view of a typical commercial airliner landing gear strut, with enclosed piston, O-ring seals and orifice plate.

Referring now to FIG. 2, there is shown each conventional and commercially available landing gear 3, 5, 7 (FIG. 1) which consists of one oleo-type shock strut 8, hereafter referred to as "strut," of which together support the weight of the airplane on tires 12, and an internal cushion of fluid, which also absorbs landing shock. In commercially available struts 8 the fluid includes hydraulic liquid (referred to herein as hydraulic fluid 15) and nitrogen gas 17. Internally each strut contains a forged steel piston 9, with an orifice plate 13 containing an orifice hole 14 that dampens the strut compression motion. O-ring seals 11 serve to retain the hydraulic fluid 15 and compressed nitrogen gas 17 inside the strut cylinder. The strut 8 can be pressurized externally through a nitrogen gas access fitting 19. Hydraulic fluid can be accessed through fitting 20.

Figure 3:
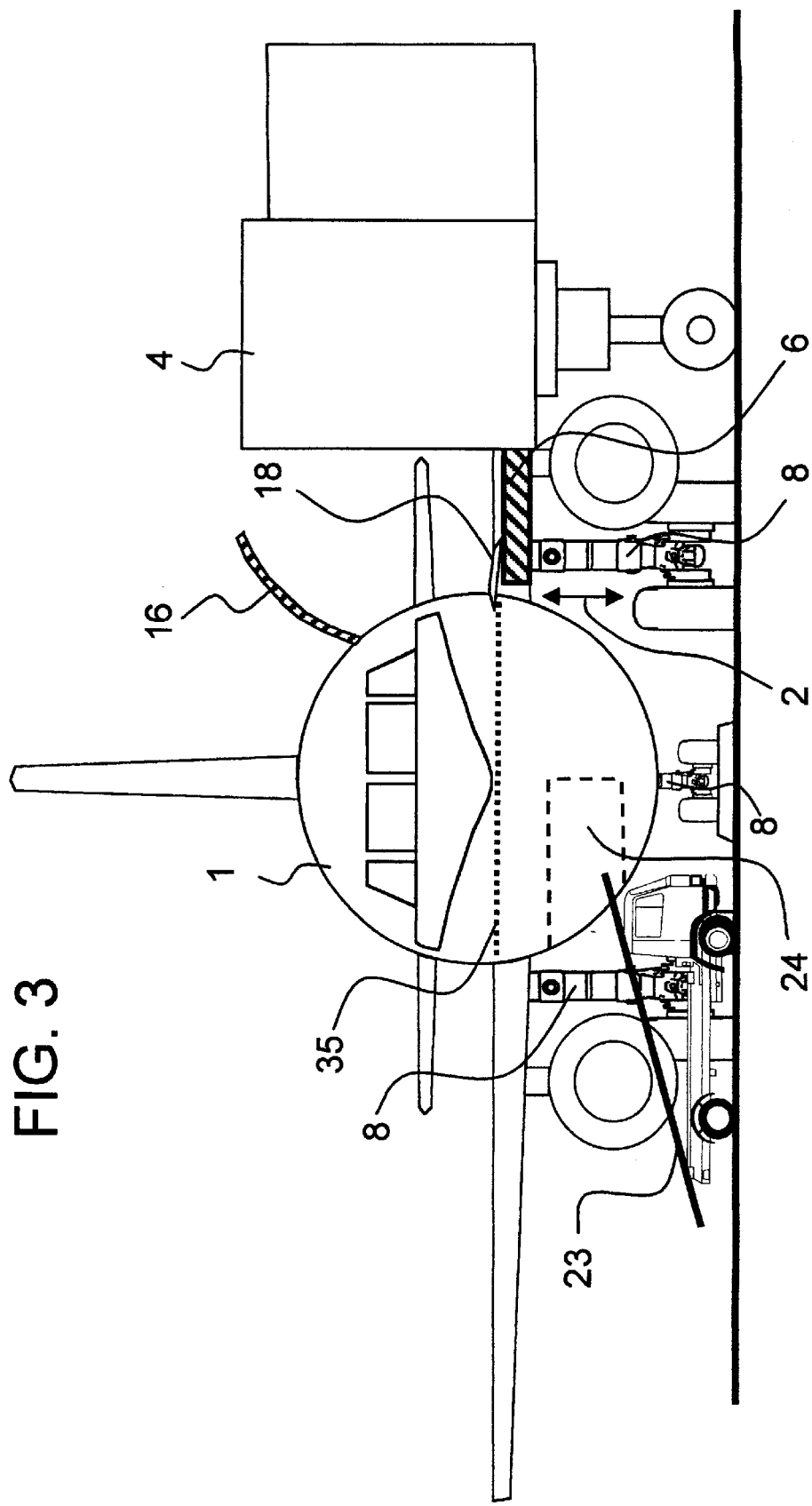
FIG. 3 is a view of a typical commercial airliner near typical airport ground support equipment.

Referring now to FIG. 3, there is shown a typical commercial airliner 1 supported by landing gear struts 8. Landing gear struts 8 compress 2 as weight is added or extend 2 as weight is removed from airliner 1. Near and around airliner 1 are typical airport ground support equipment such as a passenger jet-way 4 which has a passenger jet-bridge 6 which extends to airliner passenger hatch 16. The jet-bridge ramp 18 is placed over any gap between airliner main cabin floor 35 and passenger jet-bridge 6 and restricts all but a very slight upward and downward movement of airliner 1. Extreme upward and downward movements of airliner 1 could cause severe damage to the airliner 1 and jet-bridge 6. Motorized baggage conveyor belt arm 23 also extends into airliner 1 lower baggage compartment 24. Extreme upward and downward movement of the airliner 1 could cause severe damage to the airliner 1 and the motorized baggage conveyor belt 23.

Figure 4:
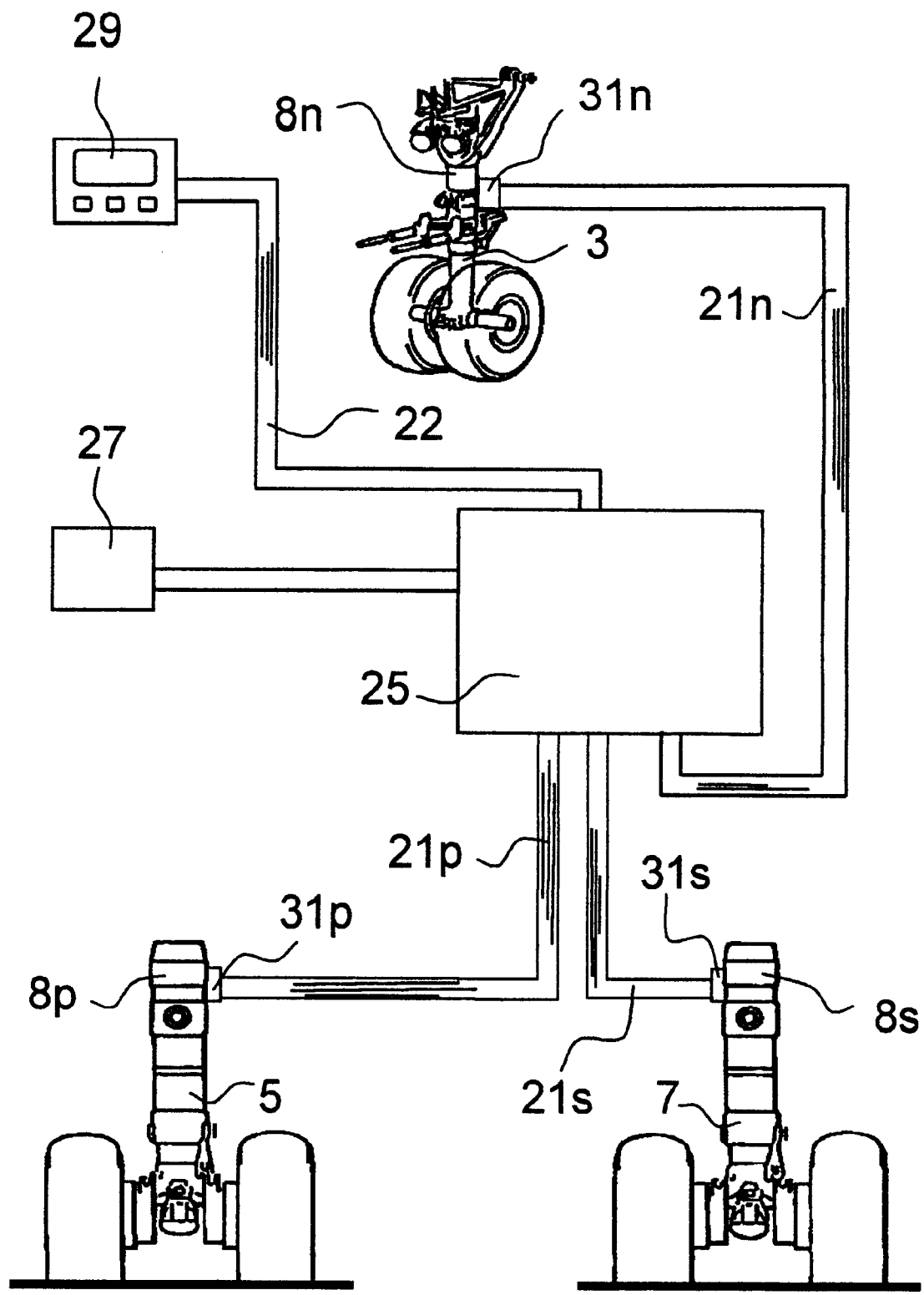
FIG. 4 is a schematic view of the invention in accordance with a preferred embodiment.

Referring now to FIG. 4, there is shown a schematic of the invention illustrating connecting components, in which n represents those components of the invention dedicated to the nose landing gear, p represents those components of the invention dedicated to the port landing gear, and s represents those components of the invention dedicated to the starboard landing gear. Nose landing gear 3, along with port main landing gear 5 and starboard main landing gear 7 support the weight of the airplane on a cushion of hydraulic fluid and compressed nitrogen gas. Internal strut pressure signals from each of the weight supporting struts are measured by pressure sensor assemblies 31n, 31p, 31s and transmitted via wiring harnesses 21n, 21p, 21s to an onboard computer/controller 25. The system is powered by an existing aircraft power source 27. Various calculations and information are transmitted via wiring harness 22 to an airplane cockpit or cargo compartment display 29.

Figure 5:
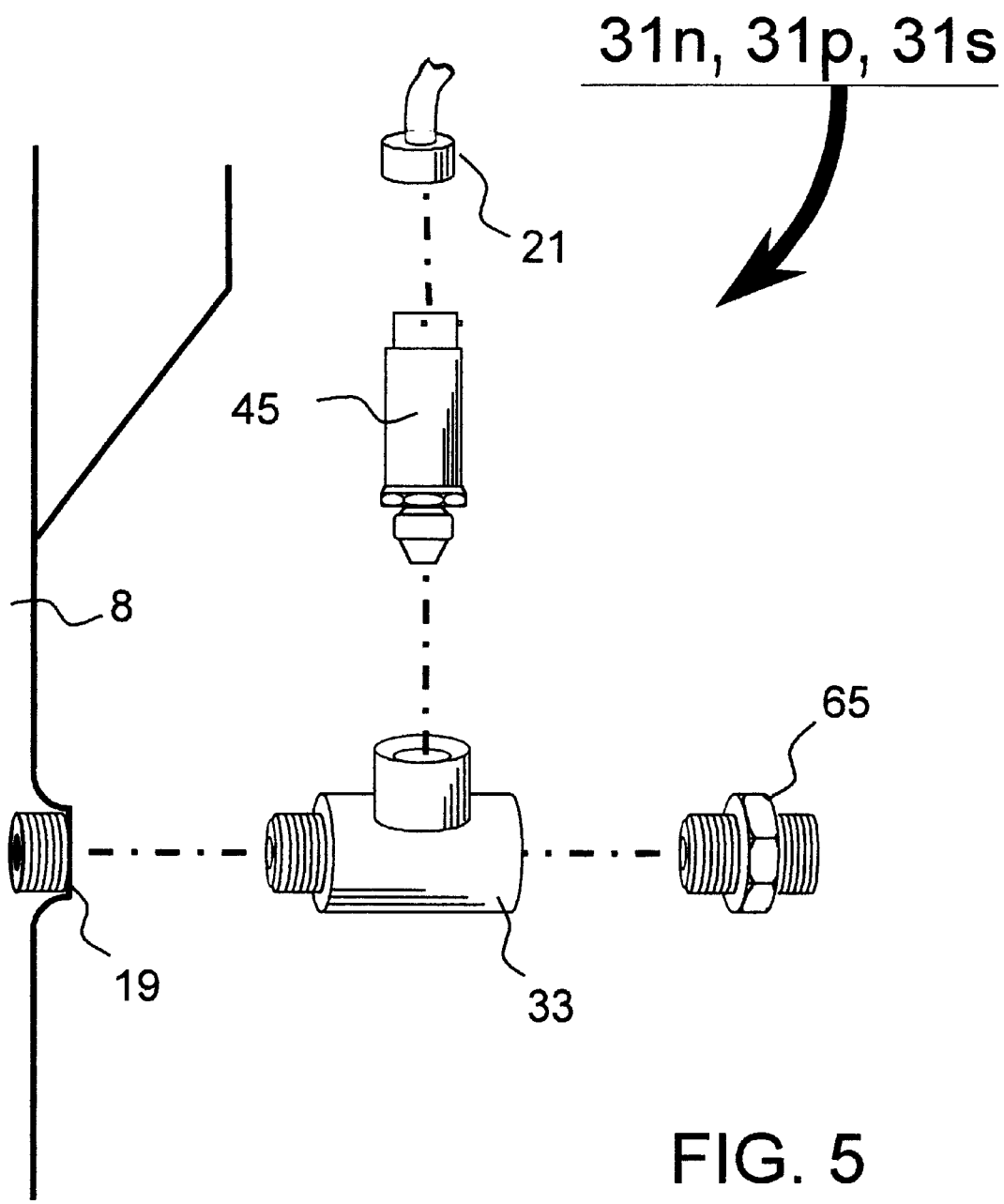
FIG. 5 is a side view of an exploded pictorial diagram of a typical commercial airline landing gear strut, shown with attached components of another embodiment of the invention.

Referring now to FIG. 5, there is shown a detailed view of the embodiment of pressure sensor assemblies 31n, 31p, 31s, wherein a typical commercial airliner strut 8 incorporates a pressurization valve 65 attached to each strut through the fitting 19. The pressurization valve 65 is removed to facilitate the installation of a T-fitting 33. A pressure sensor 45 is connected to T-fitting 33. The valve 65 is connected to the other port of T-fitting 33. Pressure signals relative to the weight supported by the strut 8 are sent to the computer/controller 25 (FIG. 4) via wiring harness 21.

Figure 6:
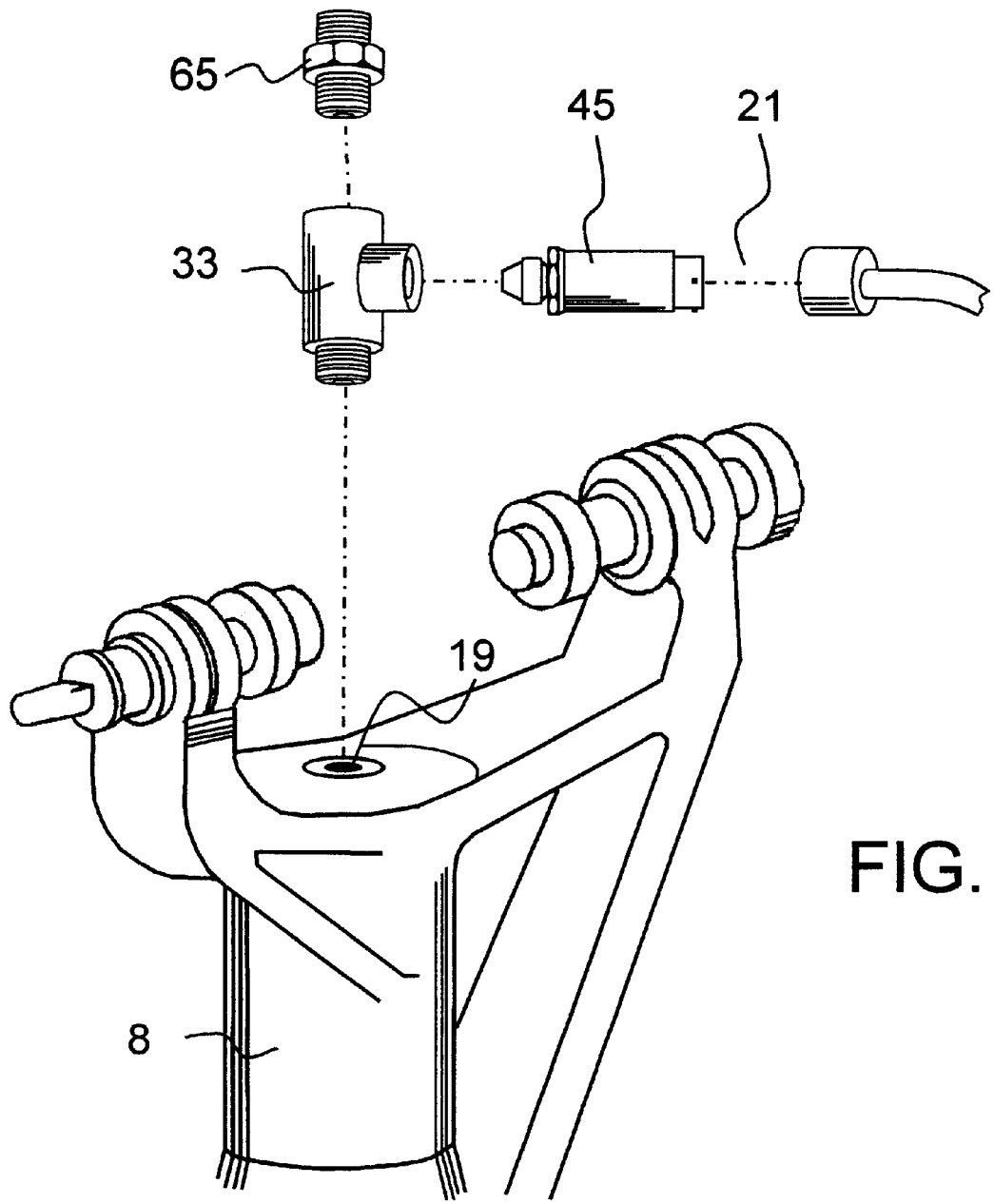
FIG. 6 is an exploded pictorial diagram of an alternate type of landing gear strut, with attached components of the invention.

Referring now to FIG. 6, there is shown an alternate detailed view of the embodiment of pressure sensor assemblies 31n, 31p, 31s, wherein an alternate view of strut 8 which incorporates a top pressurization valve 65 attached to each strut through the fitting 19. In some cases this strut 8 is limited to only one single port (in this case fitting 19) to access strut pressure. (Such a strut lacks fitting 20 (see FIG. 2)). The pressurization valve 65 is removed to facilitate the installation of a T-fitting 33. A pressure sensor 45 is connected to T-fitting 33. Pressure signals relative to the weight supported by the strut 8 are sent to the computer/controller 25 (FIG. 4) via wiring harness 21.

Figure 7:
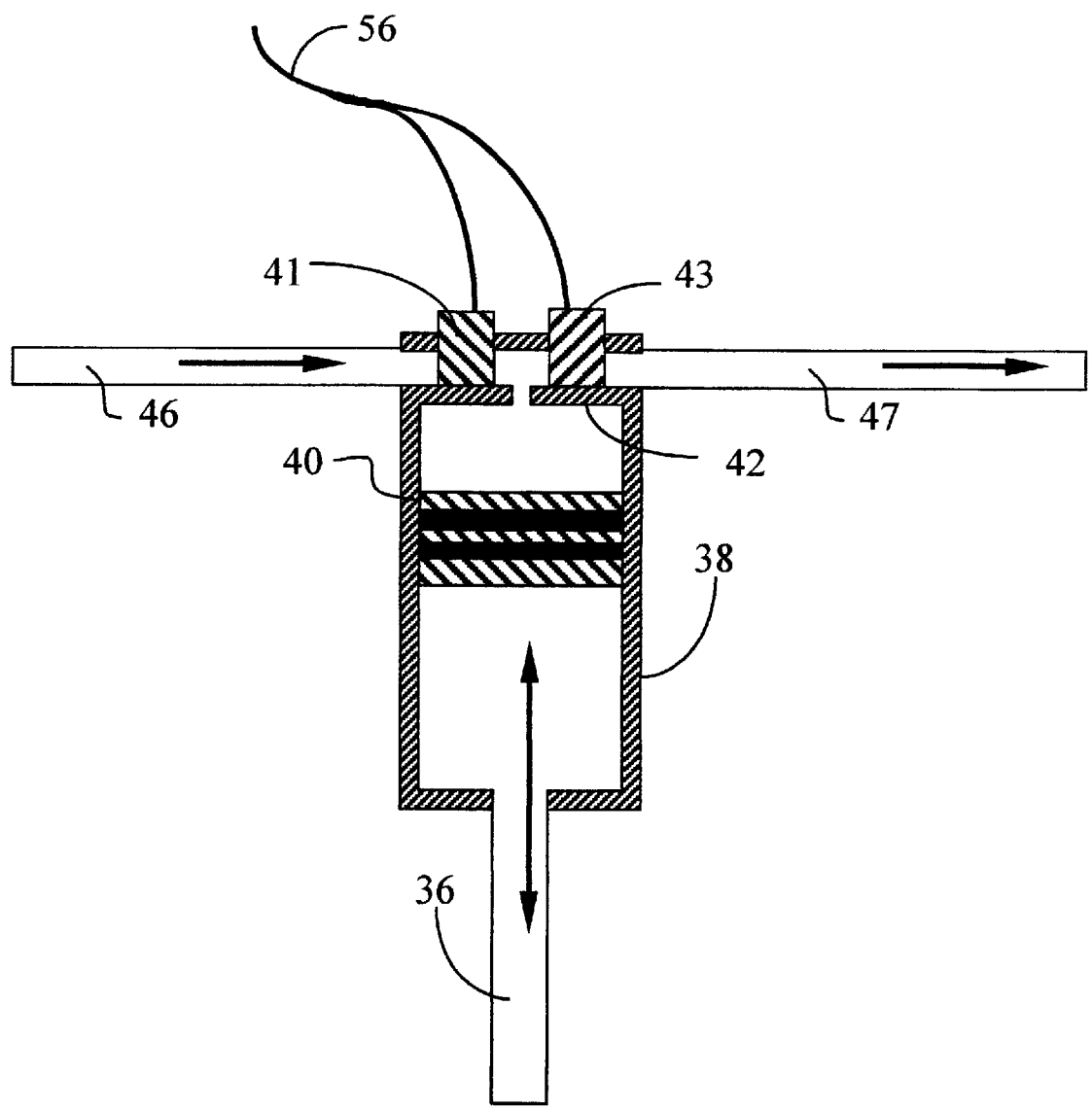
FIG. 7 is a cross-sectional view of an Isolation Metering Cylinder (IMC).

Referring now to FIG. 7, there is shown a view of an Isolation Metering Cylinder (IMC) 38. The IMC 38 is a cylindrical shaped hydraulic or pneumatic actuator with an internal floating piston 40. Hydraulic fluid flow into the IMC 38 is controlled by an electronic valve 41, with flow from the IMC 38 controlled by an electronic valve 43. Instructions to electronic valve 41 and electronic valve 43 are received from the computer/controller 25 (FIG. 4) and transmitted via wiring harness 56. A hydraulic line 46 is connected to the high pressure side of the aircraft hydraulic system, a hydraulic line 47 is connected to the zero pressure return side of the aircraft hydraulic system and a hydraulic/pneumatic line 36 is connected to the hydraulic fluid or nitrogen gas within the aircraft strut 8 (see FIG. 9). IMC 38 injects a pre-measured volume of fluid into each strut 8, then withdraws that exact volume of fluid from strut 8. To insure that the volume of fluid in strut 8 remains unchanged, floating piston 40 both begins at and returns to the same position within the cylinder 38 for each injection and withdrawal cycle. In the preferred embodiment, this position is abutting the cylinder wall 42. When IMC 38 is not being utilized in the injection and withdrawal of fluid from strut 8, electronic valve 43 will open for a defined period of time and then close. This relieves all aircraft hydraulic system pressure within IMC 38 and will locate floating piston 40 against the IMC cylinder wall 42, and be ready for the next injection and withdrawal cycle.

Referring now to FIG. 8, there is shown pressure sensor 45 connected to T-fitting 33. Pressure signals relative to the weight supported by the strut 8 are sent to the computer/controller 25 (FIG. 4) via wiring harness 21.

Figure 9:
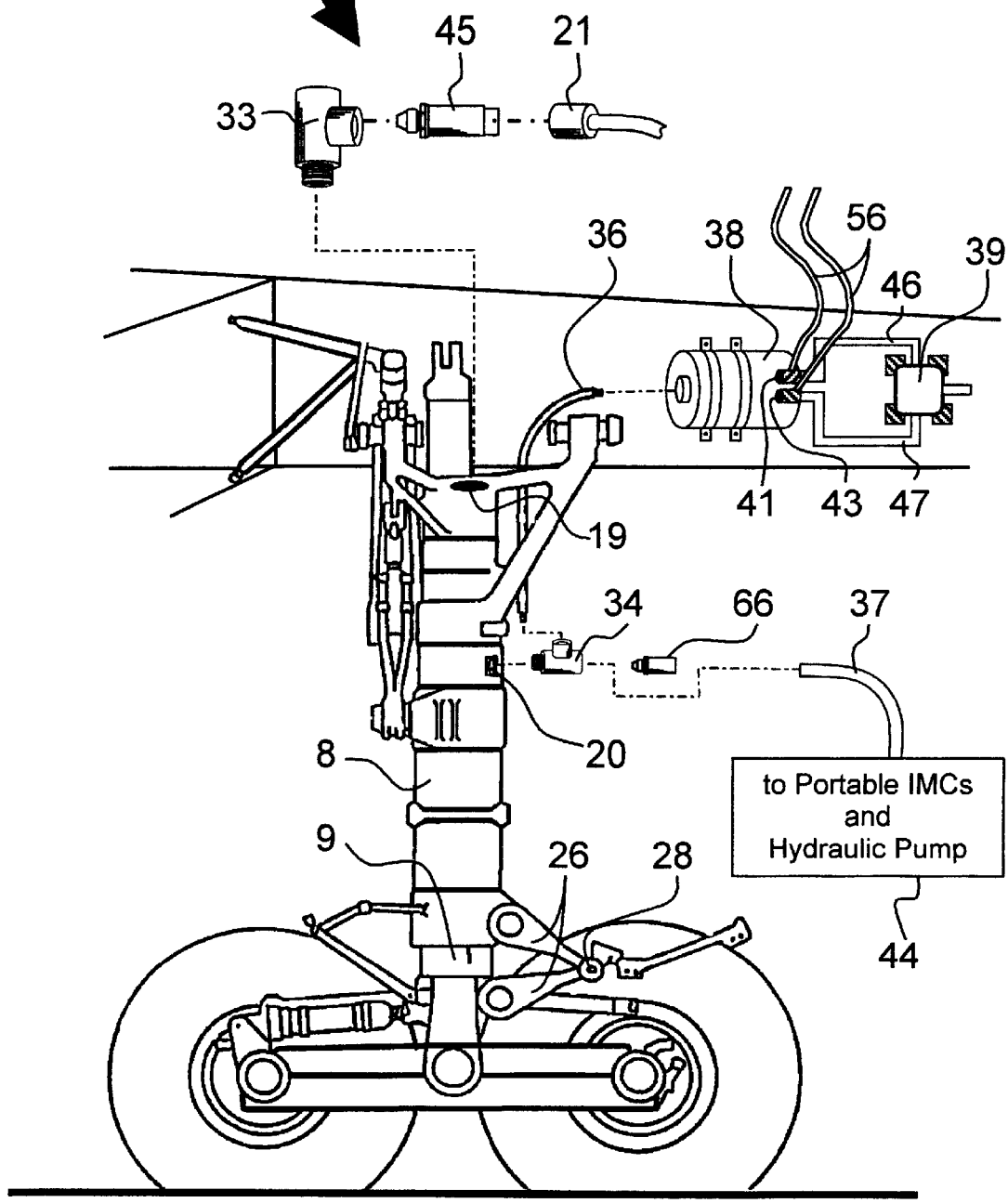
FIG. 9 is an exploded pictorial diagram of a typical commercial airline landing gear strut, with attached components of the invention.

Referring now to FIG. 9, there is shown a typical commercial airliner strut 8 that incorporates a hydraulic fluid servicing check valve 66 attached to each strut through a fitting 20. On each strut 8 the check valve 66 is removed to facilitate the installation of a T-fitting 34. A hydraulic/pneumatic line 36 is attached to T-fitting 34 and leads up the strut 8 to IMC 38, which is mounted within the landing gear well. The IMC 38 is attached to the existing aircraft hydraulic system pump 39 by a high pressure hydraulic line 46 and zero pressure return hydraulic line 47. The IMC 38 injects and withdraws a pre-measured volume of hydraulic fluid or nitrogen gas into and from strut 8 by opening and closing electronic valve 41 and electronic valve 43, respectively. It is preferred that hydraulic/pneumatic line 36 is attached to fitting 20, instead of fitting 19 which is used to attach pressure sensor 45. This separation is used to avoid false pressure measurements, during fluid flow into and from strut 8. This provides a physical separation between the pressure sensor 45 and the port 20 that is used to inject and withdraw fluid from the strut 8. If such separation is not available, a pressure-to-flow separation fitting 48 (see FIG. 10) should be added to the installation, between T-fitting 33 and fitting 19, to insure strut pressure measurements are not distorted by hydraulic fluid or nitrogen gas flow. The pressure-to-flow separation fitting will be described more fully below. Referring back to FIG. 9, the pressure source used to activate the IMC 38 is supplied by existing aircraft hydraulic system pump 39 or other pressure source available on or off the aircraft. Instructions to electronic valve 41 and electronic valve 43 are received from computer/controller 25 (FIG. 4) and transmitted via wiring harness 56. The injection and withdrawal of the pre-measured volume of hydraulic fluid, into and from each strut allows the computer/controller 25 to identify and compensate for strut pressure distortions caused by strut stiction, while keeping aircraft movement to a minimum. A detached IMC and hydraulic system pump may be used as an off-aircraft portable system 44. T-fitting 34 is adaptable to attach to the off-aircraft portable system 44 via hydraulic/pneumatic line 37.

Figure 10:
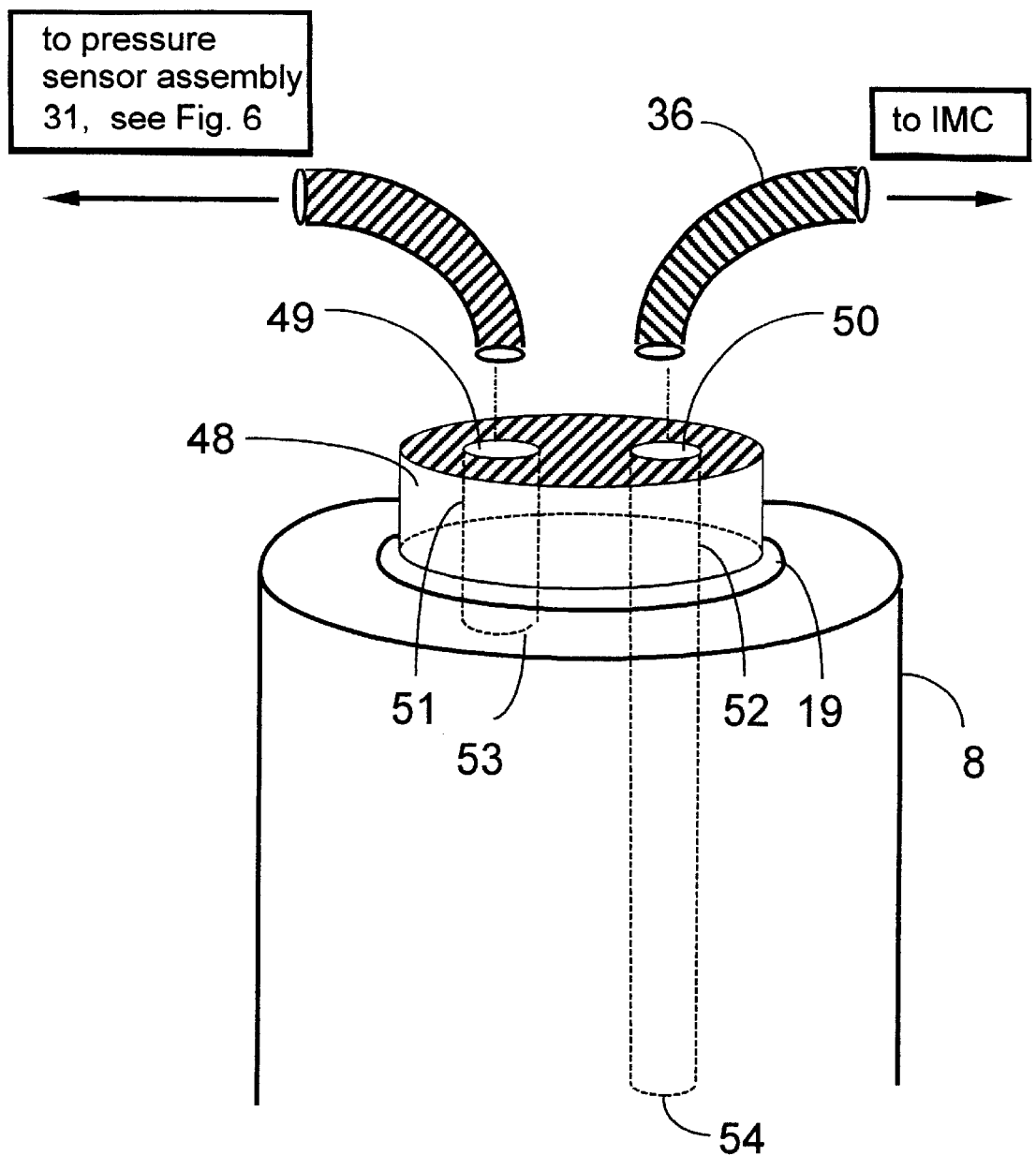
FIG. 10 is a cross-sectional view of a pressure-to-flow separation fitting.

Referring now to FIG. 10, there is shown a pressure-to-flow separation fitting 48. As discussed above, some struts 8 have only one access fitting 19. In such a strut, this single access fitting must be used to both sample pressure and inject/withdraw fluid from the strut. The pressure-to-flow separation fitting 48 incorporates a threaded fitting 49 connected to a short tube 51 and a threaded fitting 50 connected to a longer tube 52. Tubes 51, 52 extend down inside of the strut 8 to be exposed to the nitrogen gas and/or hydraulic fluid. Pressure sensor assembly 31 (FIG. 6) is attached to threaded fitting 49 and hydraulic/pneumatic line 36 is attached to threaded fitting 50. Pressure measurements access the strut 8 from port 53 (at the bottom of tube 51). IMC 38 accesses the strut 8 to inject/withdraw fluid via port 54 (at the bottom of tube 52). Ports 53, 54 are physically separated from each other inside of the strut by a volume of fluid. This separation of pressure sensor assembly 31 and hydraulic/pneumatic line 36 avoids false pressure measurements, during fluid flow into and from strut 8.

Figure 11:
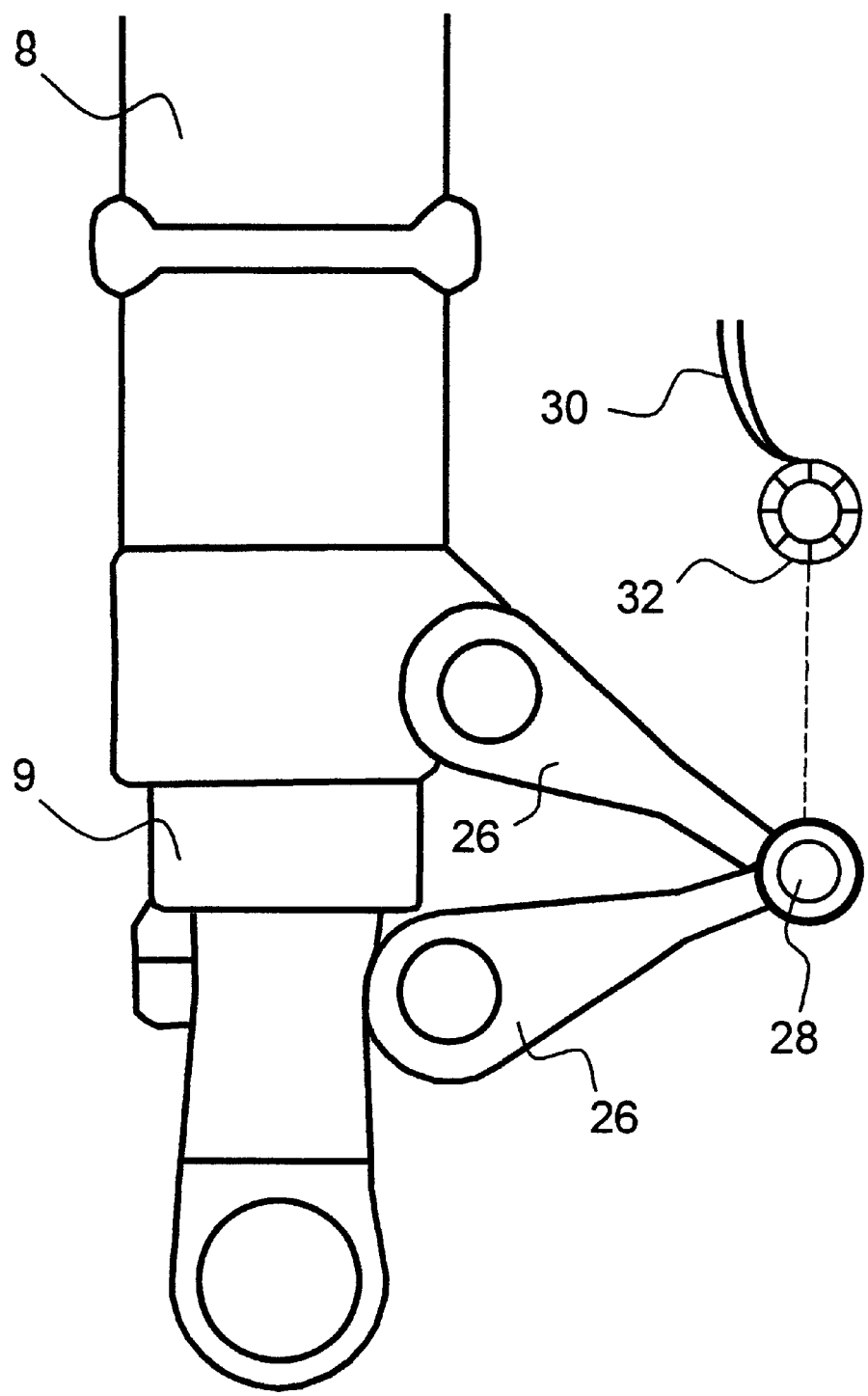
FIG. 11 is a side view of a typical commercial airliner landing gear strut scissor-link with attached components of the invention.

Referring now to FIG. 11, there is shown the lower portion of each landing gear consisting of one oleo-type shock strut 8 and a forged steel piston 9. Piston 9 is restricted from rotation within the outer cylinder of strut 8 by a strut scissor-link 26. Strut scissor-link 26 incorporates a hinge pin 28. A Radial Variable Digital Transducer, hereafter referred to as a RVDT 32, is attached to strut scissor-link 26 and hinge pin 28 in a manner which allows the RVDT 32 to measure the movement of the strut scissor-link 26 in relation to hinge pin 28. The measurement of the strut scissor-link movement is a method of mechanically determining and measuring strut extension and strut collapse. Strut extension measurement signals from RVDT 32 are sent to computer/controller 25 (FIG. 4) via wiring harness 30.

Figure 12:
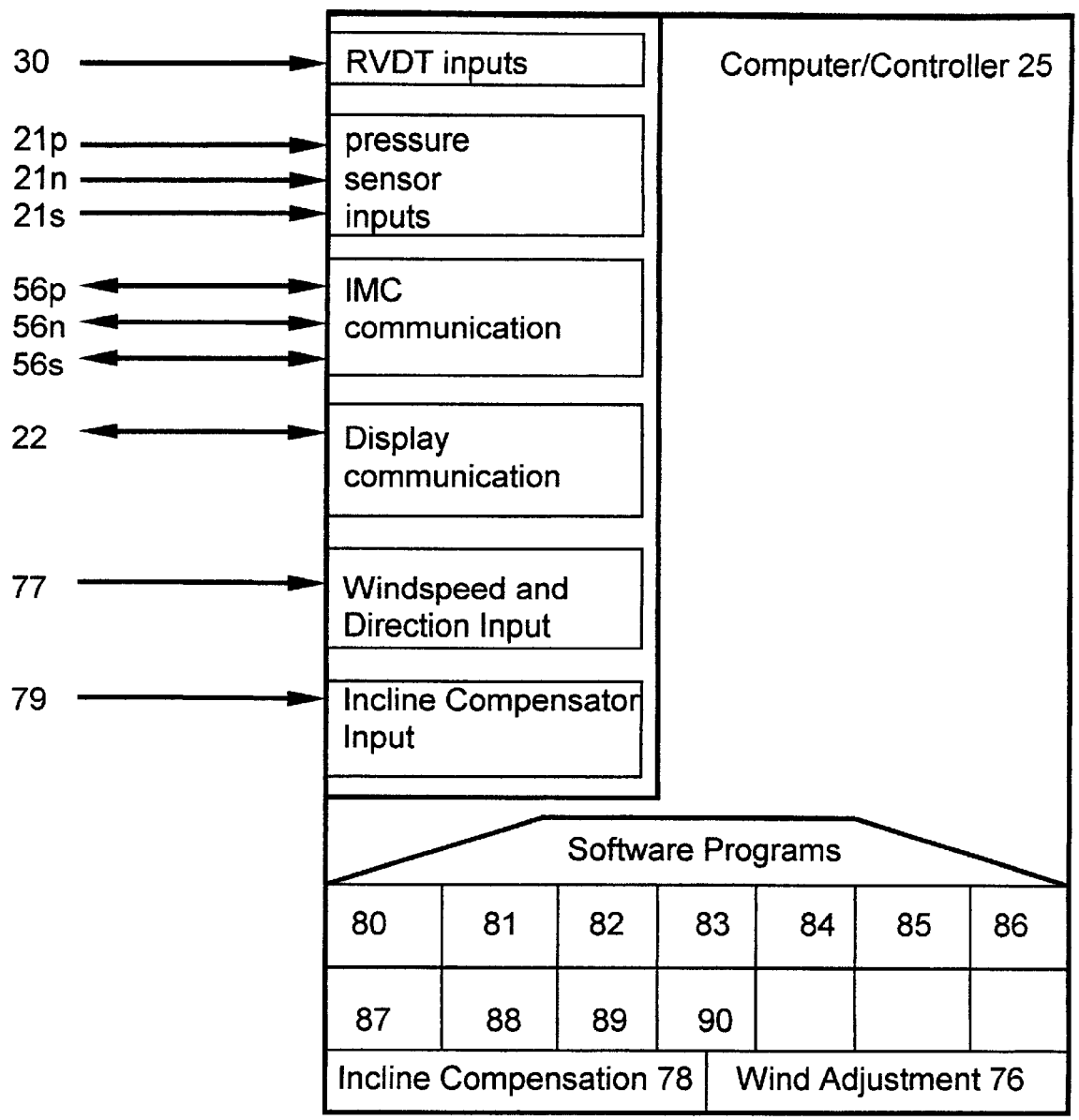
FIG. 12 is a schematic diagram of the onboard computer/controller, of the invention.

Referring now to FIG. 12, there is shown the computer/controller 25, wherein n represents those components of the invention dedicated to the nose landing gear, p represents those components of the invention dedicated to the port landing gear, and s represents those components of the invention dedicated to the starboard landing gear. Pressure input signals via the nose wiring harness 21n, port wiring harness 21p and starboard wiring harness 21s are transmitted to the computer/controller 25. Computer/controller 25 receives varying wind speed and wind direction information via wiring harness 77 from a typical externally mounted directional wind speed indicator, allowing a wind adjustment program 76 to correct the determined aircraft weight by previously measured weight errors compared to wind speed and wind direction. Wind speed and wind direction corrections are stored in the wind adjustment program 76. One method of developing wind speed correction is by placing the aircraft behind the engine prop-blast of a large turbo-prop aircraft such as a military C-130. A single or multiple C-130 aircraft will generate an external wind tunnel by increasing engine thrust. Wind speed indicators are placed at the aircraft's wing tips as the aircraft weight and center of gravity measurements are taken at different wind speeds. These weight and center of gravity measurements are related to various measured wind speeds and stored in wind speed adjustment program 76. The aircraft is rotated 15° and the weight and center of gravity measurements are again related to various wind speeds which are now crossing the aircraft at a different angle. The aircraft is rotated through a complete circle, on 15° increments to measure the affects of wind from all directions. Various weights are placed within the aircraft to insure the wind speed adjustments are measured at the full range of potential aircraft take-off weights. These stored values can be referenced for a particular wind speed and direction offset. This offset can be used to correct weight measurements using wind adjustment program 76.

Computer/controller 25 also receives aircraft incline information from a typical aircraft incline sensor via wiring harness 79. Aircraft incline compensation program 78 corrects determined aircraft weight for errors caused by the aircraft not being level. The calculations for strut stiction, gross weight, center of gravity, and incline compensation are performed by computer/controller 25 then transmitted to display 29 (FIG. 4) via wiring harness 22.

To determine the total weight of an airplane, with a tricycle landing gear configuration the following equation, Wt 80 must be solved:

$$Wn+Wp+Ws=Wt \tag{80}$$

where:
Wn is the weight supported by the nose strut,
Wp is the weight supported by the port strut,
Ws is the weight supported by the starboard strut, and
Wt is the total weight of the airplane.

One method to determine the values of Wn 81, Wp 82 and Ws 83 is to solve:

$$[(Pn \pm Sn) \times SAn] + Un = Wn \tag{81}$$

$$[(Pp \pm Sn) \times SAp] + Up = Wn \tag{82}$$

$$[(Ps \pm Sn) \times SAs] + Us = Wn \tag{83}$$

where:
Pn is the amount of Pressure within the nose strut,
Pp is the amount of Pressure within the port strut,
Ps is the amount of Pressure within the starboard strut,
Sn is the determined Stiction of the nose strut,
SP is the determined Stiction of the port strut,
Ss is the determined Stiction of the starboard strut,
SAn is the load supporting Surface Area of the nose strut,
SAp is the load supporting Surface Area of the port strut,
SAs is the load supporting Surface Area of the starboard strut,
Un is the Unsprung weight of the nose strut,
UP is the Unsprung weight of the port strut,
Us is the Unsprung weight of the starboard strut, and
Wn is the Weight supported by the nose strut,
Wp is the Weight supported by the port strut,
Ws is the Weight supported by the starboard strut, The equations Wt, Wn, Wp and Ws are solved by respective software programs 80, 81, 82 and 83 (see also FIG. 13).

To determine the values of Pn, Pp and Ps: These values are measured by each respective strut pressure sensor 45 (FIG. 5).

To determine the values of Sn, Sp and Ss: These values are measured by monitoring the pressures within each respective strut 8, while the strut is extended then collapsed, with the aircraft remaining at a constant weight (see FIG. 13). The subtraction of the lowest from the highest pressure measurements recorded while the strut is extended then collapsed, then dividing that recorded measurement by two, identifies the amount of stiction for each respective strut 8, at that moment in time; as well as the pressure within the strut as it relates to weight supported, net of stiction. Depending upon which direction the strut was last moved, the stiction value may be either added to or subtracted from the measured pressure within the respective strut 8. Another approach is to use the averaged strut pressure obtained from plural pressures that have been recorded while the strut is extended then collapsed, which averaged strut pressure is now proportional to the weight it is supporting, net of the effects of strut stiction.

To determine the values of SAn, SAp and SAs: These values are available from the aircraft strut manufacturer.

To determine the values of Un, Up and Us: These unsprung weight values are available from the aircraft strut manufacturer. These values are the weight of the respective strut components which are not located above and supported by the hydraulic fluid and compressed nitrogen gas. These unsprung weight values include the weight of the tires, axles, brakes, hydraulic fluid, etc.

To better describe aforementioned determinations of values Sn, Sp and Ss (see FIG. 13); the computer/controller program 84 coordinates instructions sent to respective IMCs 38 (FIG. 8) via wiring harnesses 56n, 56p, 56s and instructions to receive pressure measurements from respective pressure sensors 45 via wiring harnesses 21n, 21p, 21s.

The steps to determine the values Sn, Sp and Ss are performed by software program 84:
1. Each IMC 38 (FIG. 9), injects a pre-measured volume of fluid into its respective landing gear strut 8; to force the effect of stiction to be against the strut, while it is being extended.
2. Computer/controller 25 monitors strut movement as fluid is being injected into the strut. One way to monitor strut movement is to monitor the pressure inside of the strut. The computer/controller 25 monitors the rising internal strut pressure from the respective pressure sensor 45. When the effects of stiction have been overcome these monitored pressures will cease to rise, drop slightly (causing a positive peak pressure or "pressure recoil") then remain constant, as the strut begins to extend. This highest pressure measurement will be stored.
3. Each IMC 38, will then withdraw that same pre-measured volume of hydraulic fluid from its respective strut 8, allowing the effects of stiction to reduce the internal strut pressure prior to the strut beginning to collapse.
4. Computer/controller 25 monitors strut movement as fluid is being withdrawn. The computer/controller 25 continues to monitor the now falling internal strut pressures from the respective pressure sensor 45. When the effects of stiction have been overcome, the monitored pressures will cease to fall, rise slightly (causing a negative peak pressure or "pressure recoil") then remain constant, as the strut begins to collapse. This lowest measurement will be stored. Strut stiction yields artificially high pressure measurements when the strut extends while strut stiction yields artificially low pressure measurements when the strut collaepses. The order of the fluid injection, then withdrawal, may be reversed to allow the fluid withdrawal prior to fluid injection.
5. The computer/controller 25 will request the previously stored highest and lowest (peak) pressure measurements from each strut 8 and average those respective measurements to identify the respective strut pressure as it relates to weight supported, net of the current effects of stiction.

In the above procedures, strut movement is determined by detecting peak strut pressures. Alternatively, strut movement can be detected by the computer/controller 25 using the RVDT 32 (see FIGS. 11 and 12).

By injecting and withdrawing the same amount of fluid from the strut, the net change of fluid in the strut is zero. This maintains a proper ratio or balance of hydraulic fluid to nitrogen gas in the strut.

To determine the center of gravity (CG) of an aircraft the following equation CG 85 must be solved:

$$\{[Wn \times nl] + [(Wp + Ws) \times ml)]\} \div Wt = CG \quad (85)$$

where:
Wn is the weight supported by the nose strut,
Wp is the weight supported by the port strut,
Ws is the weight supported by the starboard strut,
Wt is the total weight of the airplane,
nl is the location of the nose strut,
ml is the location of the port and starboard main struts, and
CG is the center of gravity of the aircraft.

The equation to determine the aircraft CG is solved by software program 85.

Irregardless of the loading configuration of a particular aircraft nl and ml are known constants; Wn, Wp, Ws and Wt are values provided through the solution to the equations 80–83 to determine the total weight of the airplane.

An additional computer/controller program 86, which indicates wing-lift distorting ice accumulations as well as changes in aircraft weight due to those ice accumulations, is available as an option. As a reference, the weight of a cubic foot of ice is stored into the memory of this program (this weight equals 12 square feet of ice 1 inch thick, or 48 square feet of ice ¼ inch thick, etc.). The total exterior surface square footage, of that particular aircraft, on which ice can accumulate is determined and also stored in the permanent memory of this program. As an alternative, tables may be supplied by the aircraft manufacturer relating ice thickness as a function of weight gains on that particular aircraft. Once the aircraft loading has been completed and all deicing procedures have been implemented, the pilot can then save within this program, the aircraft's current "clean loaded weight". If take-off delays force the aircraft to wait and allow the re-accumulation of ice deposits on exterior surface areas, those accumulations can be indicated in real time as they relate to added weight shown on this invention. The pilot may recall the "clean loaded weight" and compare it to existing weight, less any fuel burn, at any time prior to take-off When an aircraft is sprayed with de-icing fluid the aircraft weight increases in direct proportion to the weight of that de-icing fluid. The weight of the average volume of de-icing fluid used to de-ice a particular aircraft type, can be measured and stored into a de-ice program 87. Similar procedures as those described in "de-ice" program 87 are performed to generate a "rain weight" program 90, for measuring and offsetting the weight of water accumulations on the exterior surfaces of the aircraft. De-icing fluid is in the form of a thick gel where water is not. The weight of water accumulations on the exterior surfaces of the aircraft are less than that of de-icing fluid. When the aircraft is approaching take-off speeds, water or de-icing fluid and residual ice on the aircraft, as well as their weight, will blow off of the aircraft, making the aircraft lighter than originally measured. The pilot can properly adjust downward the measured weight of the aircraft through the implementation of de-ice program 87, or if weather conditions dictate, "rain weight" program 90. A detached computer/controller 25 may be used as an off-aircraft portable system.

Figure 13:
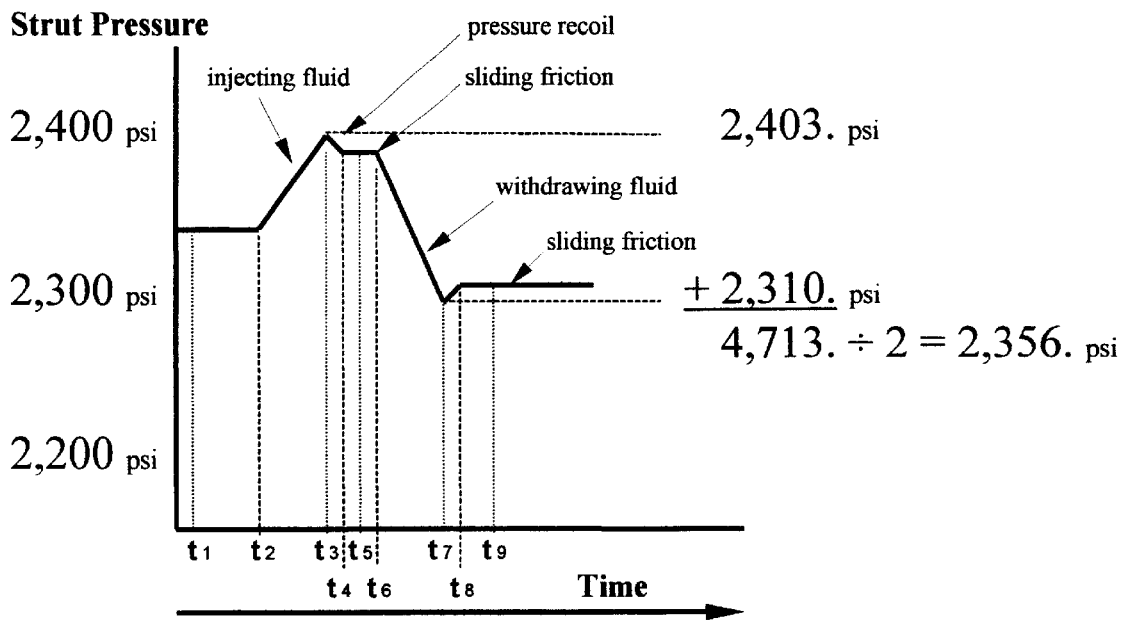
FIG. 13 is an illustration of the method of measuring landing gear strut stiction.

Referring now to FIG. 13, there is shown an illustration of software program 84 (FIG. 12) that identifies and measures strut stiction. While the system is in operation, the pressure of the fluid within a strut is measured in pounds per square inch (psi). Strut pressure is monitored over time, t1 through t9. Strut pressure will increase as additional fluid is injected into the strut. Once sufficient fluid has been injected into the strut to overcome the current amount of strut stiction, internal strut pressure will decrease slightly (pressure recoil) then remain constant (sliding friction) as the strut will begin to extend, The computer/controller 25 (FIG. 12) monitors strut pressure at a very rapid rate (example, 1,000 pressure samples per second) during the entire process. Strut pressure remains relatively constant between times t1–t2. At time t2, the computer/controller 25 opens the IMC valve 41 to inject fluid into the strut. Nitrogen gas is relatively compressible, where hydraulic fluid is not. As fluid is injected into the strut, the pressure within the strut increases as the nitrogen gas within the strut compresses. Between times t2 and t3, fluid is injected into the strut, but the strut does not extend. The compressive characteristics of the nitrogen gas acts as a "pressure loaded spring" within the strut. At the exact moment (time t3) the strut begins to extend (as O-rings 11, FIG. 2 break free and begin to move along the strut cylinder wall) the amount of strut stiction or friction changes from a higher static friction to a lower sliding fiction. The pressure built-up and stored within the nitrogen gas "spring" releases and will then extend the strut a small amount with a slight decrease in strut pressure (pressure recoil at time t4). The strut extends slightly between times t3 and t5. The speed of the computer/controller and its ability to instantaneously react to pressure changes allows the computer to close IMC valve 41 (time t5) after the strut begins its initial extension, which stops fluid flow into the strut and limits strut extension.

The monitored pressure within the strut reveals a pressure increase (time t2–t3) as the hydraulic fluid or nitrogen gas is injected and a definite reversal or slight decrease in pressure (time t3–t4) as the strut initially extends and the nitrogen gas "spring" is released within the strut. The peak pressure (time t3), followed by the pressure reversal (time t3–t4), followed by the stabilization of pressure (time t4–t5) are indications to computer/controller that the strut has in fact extended and confirms that the highest pressure recorded (time t3) just prior to the reversal is to be used in the strut stiction measurement.

Thus, fluid is injected into the strut between times t2–t5. The strut extends between times t3–t5.

Each of the respective landing gear struts may have a different amount of friction to overcome and thus measure. Software program 84 monitors all struts simultaneously. If one of the respective struts extends prior to the remaining struts, software program 84 will delay the continuation of the strut friction measurement process on that strut (time t5–t6), until the computer/controller has recognized that all remaining struts have reached a similar posture in the strut friction measurement process. Thus, at time t5–t6, the strut does not extend if any of the remaining struts have not reached t5.

After all of the struts on the aircraft have been extended slightly, the fluid which has been injected into the strut is then withdrawn, beginning at time t6, causing the pressure within the strut to decrease. Between times t6 and t7, the strut does not move. Once the strut pressure has decreased below the point at which a combination of strut stiction combined with the strut pressure will support the weight carried by that strut, the landing gear will begin to collapse at time t7. Just prior to the landing gear beginning to collapse the pressure within the strut will reach its lowest point (time t7) in relation to the current amount of weight supported. Again the speed of the computer/controller and its ability to instantaneously react to pressure changes allows the computer/controller to close IMC valve 43 at time t9. Thus, the strut only moves between times t7 and t9. Monitored strut pressure measurements will reveal a second pressure reversal (time t8) in the opposite direction from that of the strut extension. As strut pressure decreases and the strut begins to collapse, in conjunction with the closing of IMC valve 43 (time t9), the downward inertia of the strut mass will cause that second pressure reversal (time t8) in the opposite direction. The highest and lowest measured pressures are recorded during this process that typically takes 4–6 seconds.

Thus, fluid is withdrawn from the strut between times t6–t9. The strut collapses between times t7–t9.

Nitrogen gas which has been compressed or expanded changes temperature. This change in temperature, hereafter called the "thermal effects", changes internal strut pressure beyond that strut pressure relative to the combination of supported weight and strut stiction. The amount of fluid injected and withdrawn is kept to a minimum, also serving to eliminate any thermal effects. The speed at which the computer/controller measures the highest and lowest pressures, as well as injects and withdraws fluid, minimizes strut movement and strut pressure distortions caused by the thermal effects.

The highest and lowest recorded pressures are averaged to determine the strut pressure, as it relates to the actual weight supported, net of the effects of strut stiction. By stopping strut movement (extension, collapse) almost as soon as strut movement begins, several advantages are realized. First, the thermal effects of the nitrogen gas in the struts are reduced. A second advantage in minimizing strut movement is to avoid distortions in the center of gravity determinations. The center-of gravity of the aircraft is based on the weight distributions between the nose and main landing gear struts. Extensive strut movement will shift weight from one strut to another, distorting center of gravity determinations. A third advantage in minimizing strut movement is that weight and center of gravity determinations can be made in normal day to day operations. The present invention allows weight and center of gravity to be determined while the aircraft is loading passengers and cargo. The extension and collapse of each strut is minimized to a fraction of an inch (typically ¼–½ of an inch) This maintains the vertical alignment of the aircraft hatch with its respective ramp. It also eliminates any passenger discomfort that might be caused by moving the struts (and consequently the aircraft) up and down. Because the weight and center of gravity can be determined during other ground operations, the time that the aircraft spends on the ground can be minimized. Furthermore the rapid sampling of pressure measurements allows the weight and center of gravity to be determined in real time, as weight is removed from, or added to the aircraft.

Strut stiction is not exactly symmetrical in its effects on strut pressure for both the extension and collapsing of the strut. As strut pressure is increased, O-ring seals have a slightly higher amount of friction. As strut pressure is decreased, O-ring seals have a slightly lower amount of friction. To increase the accuracy in the measurement of asymmetrical strut stiction, strut O-ring seal friction characteristics are measured and an offset equation 88 (FIG. 12) is made to the averaging of the strut's highest pressure and lowest pressure. The offset equation 88 is determined empirically and stored in the computer/controller 25.

Figure 14:
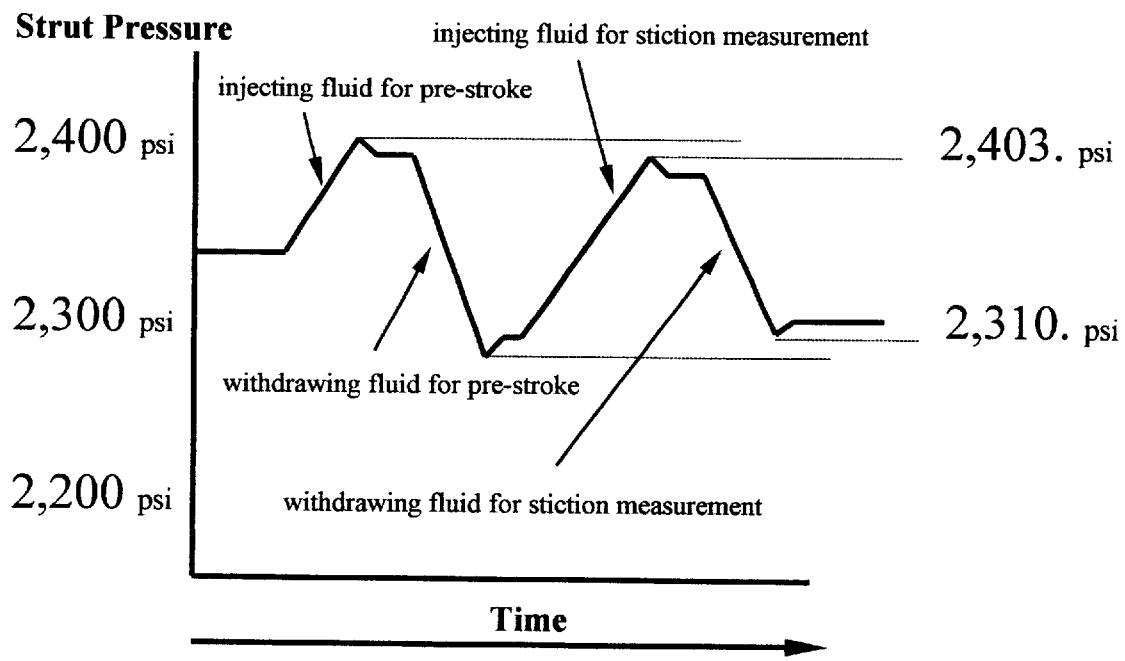
FIG. 14 is an illustration of the method of reducing landing gear strut stiction.

Referring now to FIG. 14, there is shown an illustration of additional elements and procedures of software program 84 (FIG. 12). In addition to the instructions to each IMC 38 from the computer/controller 25 to inject and withdraw fluid into and from each strut 8, the computer/controller 25 also instructs each IMC 38 to repeat the hydraulic fluid injection and withdrawal process through a second cycle. The first injection and withdrawal cycle is used to clean and lubricate the surface of strut piston 9 (FIG. 2). The first injection and withdrawal cycle deposits a thin film of hydraulic fluid on the surface of the strut piston 9. This thin film of hydraulic fluid reduces the amount of strut O-ring friction, thus reduces the separation between the previously discussed highest and lowest recorded pressures. This invention utilizes the concept of accurately measuring landing gear strut stiction. By reducing the amount of landing gear strut stiction, the accuracy of this invention over that of the prior art, is greatly increased.

Figure 15:
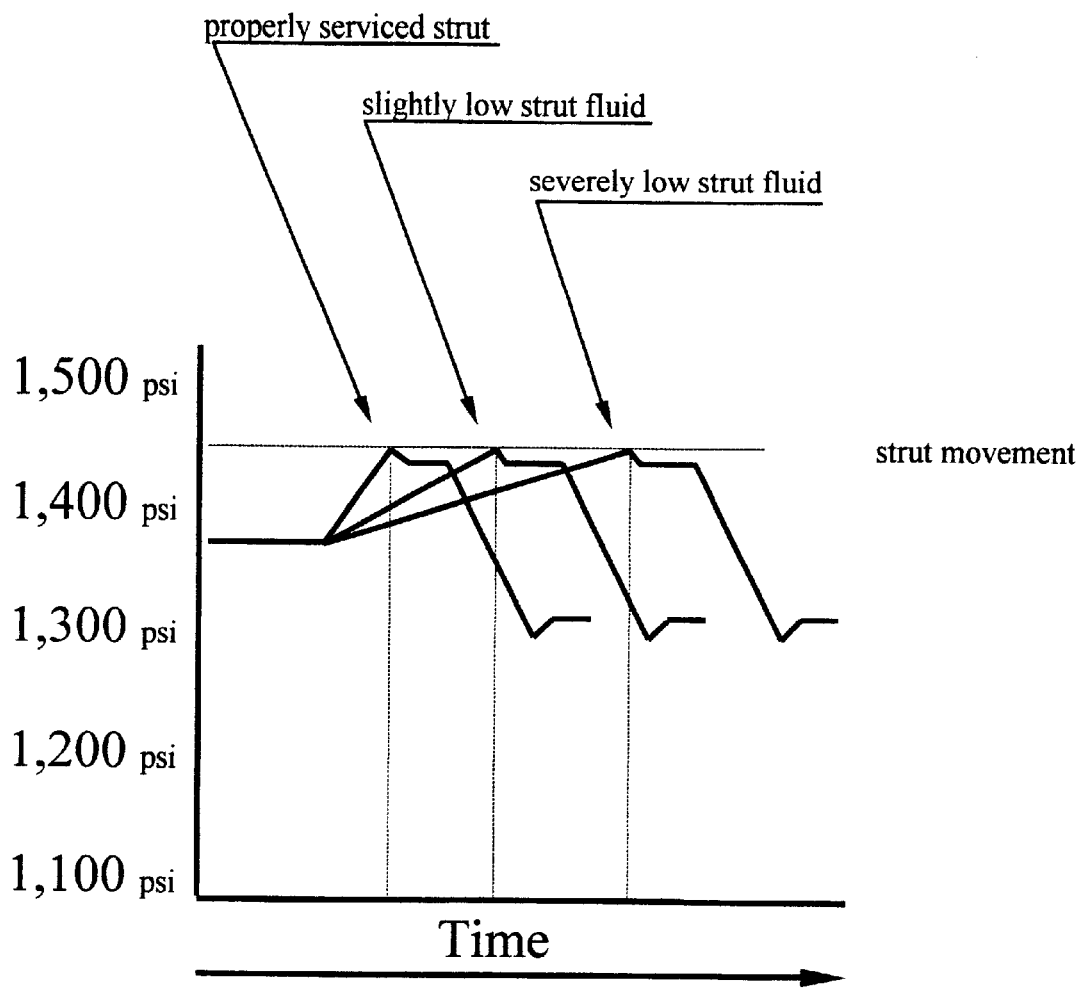
FIG. 15 is an illustration of the method of identifying low levels of landing gear strut hydraulic fluid.

Referring now to FIG. 15, there is shown an illustration of software program 89 (FIG. 12) that identifies and measures deficient levels of strut fluid. Nitrogen gas is relatively compressible, where hydraulic fluid is not. Struts which appear to have the proper strut posture, that in fact have a deficient level of hydraulic fluid, are over-serviced with an excess of nitrogen gas. Strut pressure increases are measured as hydraulic fluid is injected into each strut at a constant rate of flow, then compared against the time taken to reach initial strut extension (or strut compression) identified by the pressure recoil. When hydraulic fluid is injected into a strut which has a deficient level of hydraulic fluid, the pressure within the strut increases at a slower rate (than a properly serviced strut) as the excess nitrogen gas within the strut compresses. The excess amount of nitrogen gas acts as a spring, offsetting the volume of hydraulic fluid being added. The internal strut pressure required to start the initial strut extension will be the same. For a given flow of hydraulic fluid, the length of time required to reach that same pressure will be longer. Furthermore, the volume of hydraulic fluid needed to overcome strut stiction will increase. For a strut with too much hydraulic fluid relative to nitrogen gas, the rate of pressure change is faster than a properly serviced strut. The identification and monitoring of the rate of change of internal strut pressure required to start the initial strut extension determines the deficiency in strut fluid levels. This time vs. pressure change is measured and stored in software program 89. The measured rate of change is compared to a look-up table to determine the ratio of hydraulic fluid to nitrogen gas. From this comparison it can be determined if the strut has a proper amount of hydraulic fluid.

In a practical application of the preferred embodiment of this new invention, the computer/controller will perform the following tasks:

1. Monitor pressure measurements from each strut using the pressure sensors.
2. Inject hydraulic fluid or nitrogen gas, into each strut while the aircraft remains at a relative constant weight.
3. Look for a pressure increase and then a pressure reversal indicating initial strut extension.
4. Immediately stop the injection into each strut upon detecting strut movement.
5. Withdraw hydraulic fluid or compressed nitrogen gas, from each strut while the aircraft remains at a relative constant weight.
6. Look for a pressure decrease and then a pressure reversal indicating initial strut collapse.
7. Immediately stop the withdrawal from each strut upon detecting strut movement.
8. Make the appropriate adjustments, for stiction, to the measured pressure readings.
9. Make the appropriate adjustments for unsprung weight.
10. Calculate the total weight and center of gravity of the aircraft.
11. Display the calculated aircraft weight and center of gravity to the pilot.

By stopping strut movement (extension, collapse) almost as soon as strut movement begins, several advantages are realized. First, the thermal effects of the nitrogen gas in the struts are reduced as discussed above. A second advantage in minimizing strut movement is that weight and center of gravity determinations can be made in normal day to day operations. The present invention allows weight and center of gravity to be determined while the aircraft is loading or discharging cargo and passengers. The extension and collapse of each strut is minimized to a fraction of an inch (typically ¼–½ of an inch). This maintains the vertical alignment of the aircraft hatch with its respective ramp. It also eliminates any passenger discomfort that might be caused by excessive upward and downward strut movement (and consequently the aircraft). Because the weight and center of gravity can be determined during other ground operations, the time the aircraft spends on the ground can be minimized. Furthermore the rapid sampling of pressure measurements allow the weight and center of gravity to be determined in real time, as weight is removed from, or added to, the aircraft.

Although an exemplary embodiment of the invention has been disclosed and discussed, it will be understood that other applications of the invention are possible and that the embodiment disclosed may be subject to various changes, modifications, and substitutions without necessarily departing from the spirit of the invention.

What is claimed is:

1. A method of determining the relative amounts of gas and liquid in an aircraft landing gear strut, comprising the steps of:

a) changing the amount of fluid in said strut;

b) measuring the pressure in said strut while changing the amount of said fluid;

c) determining the rate of change of pressure in said strut;

d) determining the relative amount of said liquid to said gas from said rate of change in strut pressure.

2. The method of claim 1 wherein the step of determining the relative amount of said liquid to said gas further comprises the step of comparing the measured rate of change of pressure of said strut to a look-up table of known rates of change in pressure.

* * * * *

UNITED STATES PATENT AND TRADEMARK OFFICE
CERTIFICATE OF CORRECTION

PATENT NO. : 6,293,141 B1
DATED : September 25, 2001
INVENTOR(S) : C. Kirk Nance It is certified that error appears in the above-identified patent and that said Letters Patent is hereby corrected as shown below:

Column 9,
Line 65, Equation [82], change "$W_n$", to read -- $W_p$ --.
Line 65, Equation [83], change "$W_n$", to read -- $W_s$ --.

Signed and Sealed this

Twenty-fourth Day of February, 2004

JON W. DUDAS
*Acting Director of the United States Patent and Trademark Office*